United States Patent
Kaupp

[11] Patent Number: 5,931,295
[45] Date of Patent: Aug. 3, 1999

[54] STORAGE DEVICE PREFERABLY FOR SEVERAL COMPACT DISCS

[75] Inventor: Jochen Kaupp, Waldachtal, Germany

[73] Assignee: Fischerwerke Artur Fischer GmbH & Co. KG, Waldachtal, Germany

[21] Appl. No.: 09/001,235

[22] Filed: Dec. 30, 1997

[30] Foreign Application Priority Data

Jan. 10, 1997 [DE] Germany ................ 297 00 314 U

[51] Int. Cl.⁶ ................................................ B65D 85/57
[52] U.S. Cl. ........................ 206/308.1; 312/9.22; 312/9.57
[58] Field of Search ................................... 206/307, 308.1; 312/9.16, 9.19, 9.22, 9.24, 9.26, 9.57; 362/86, 87

[56] References Cited

U.S. PATENT DOCUMENTS

| | | | |
|---|---|---|---|
| 4,436,201 | 3/1984 | Inaba | 206/308.1 |
| 4,705,166 | 11/1987 | Ackeret | 206/308.1 |
| 4,760,502 | 7/1988 | Ackeret | 206/308.1 |
| 4,807,749 | 2/1989 | Ackeret | 312/9.22 |
| 5,366,073 | 11/1994 | Turrentine et al. | 206/308.1 |
| 5,505,299 | 4/1996 | Ditzig et al. . | |
| 5,593,031 | 1/1997 | Uchida | 206/308.1 |
| 5,638,952 | 6/1997 | Kim | 206/308.1 |
| 5,746,314 | 5/1998 | Knutsen et al. | 206/309 |

FOREIGN PATENT DOCUMENTS

| | | |
|---|---|---|
| 84 36 936 | 5/1986 | Germany . |
| 84 36 938 | 5/1986 | Germany . |
| 86 20 007 | 11/1986 | Germany . |
| 35 44 054 A1 | 6/1987 | Germany . |
| 89 01 835 | 5/1989 | Germany . |
| 39 42 845 A1 | 6/1991 | Germany . |

Primary Examiner—David T. Fidel
Attorney, Agent, or Firm—Michael J. Striker

[57] ABSTRACT

A storage device for compact disks has a housing provided with guide a unit, a slider member guided by the guide a unit and adapted to accommodate a compact disk, spring a unit urging the slider member into a removal position projecting out of the housing, a latching arrangement holding the slider member against a force of the spring a unit in a position pushed into the housing, an unlatching button for unlatching the latching arrangement, the latching arrangement having a bending bar with one end fixedly attached and another end which is free, the bending bar having at a distance from the fixedly attached end, a catching lug, a catching surface in which the catching lug is in engagement when the slider member is in the pushed-in position, the bending bar having the unlatching button at the free end so that on actuation of the unlatching button the bending bar is bent resiliently so that the catching lug comes free of the catching surface.

13 Claims, 3 Drawing Sheets

STORAGE DEVICE PREFERABLY FOR SEVERAL COMPACT DISCS

BACKGROUND OF THE INVENTION

The present invention relates to a storage device for preferably several compact discs, which is intended for mounting, for example in a central console of a motor car.

Such a storage device is disclosed in DE 39 42 845 A1. The known storage device has a box-shaped housing, which is open at a front face and in which slider members are guided displaceably in the manner of drawers from a position pushed into the housing into a removal position projecting out of the housing from the front face. The slider members have a circular depression, which has the same diameter as a compact disc and which is used as a receptacle for inserting a compact disc. The slider members are pushed out into the removal position by means of an opening spring element. The slider members are held in their pushed-in position by a latching arrangement, which can be unlatched using an unlatching button.

The latching arrangement of the known storage device is arranged on the front face of the slider members, more specifically on the left-hand and right-hand sides alternately in order to avoid unintentional latching of two slider members simultaneously. The latching arrangement has a bending bar, one end of which is articulated on the slider member and the other end of which is supported on the slider member by means of a cantilever arm as to be displaceable in the longitudinal direction of the bending bar. The cantilever arm, which is integral with the bending bar, juts out from the bending bar approximately at a right angle and, at its end remote from the bending bar, is articulated on the slider member. The end of the bending bar having the cantilever arm projects, in extension of the bending bar, beyond the cantilever arm and, laterally, beyond the slider member and forms a catching lug which, when the slider member is in the pushed-in position, is in engagement with a catching surface formed by an opening in the housing. In its middle, the bending bar has the unlatching button, which juts out from it at a right angle to the front face of the slider member. Pressing the unlatching button causes the bending bar to be resiliently flexed and, as a result, the distance between its end to be shortened. Its end forming the catching lugs is thus drawn laterally into the slider member and disengages from the catching surface of the housing, with the result that the slider member is unlatched and is pushed out of the housing into the removal position by the opening spring element.

The latching arrangement of the known storage device has a complicated shape, with the result that an injection-moulding die needed to produce it is complicated to manufacture and, consequently, expensive.

SUMMARY OF THE INVENTION

Accordingly, it is an object of the invention to provide a storage device for preferably several compact discs of the type mentioned at the beginning having a simple constructed latching arrangement that can be manufactured economically.

In keeping with these objects and, one feature of the present invention resides, in a storage device which has a bending bar running in the displacement direction of the slider member, one end of which bending bar is fixedly attached to the slider member, the other end of the bending bar is free and can therefore be pushed to the slide, with the bending bar being bent resiliently, the unlatching button is preferably formed integrally with the free end of the slider member, an actuation of the unlatching button causes the bending bar to bend resiliently, on that side of the bending bar away from which it bends as a result of actuation of the unlatching button, there is arranged, at a distance from the fixed end of the bending bar, a catching lug which is in engagement with a catching surface of the housing when the slider member has been pushed into the housing.

That catching surface may form the edge of an opening in the housing. Actuation of the unlatching button causes the bending bar to flex so that the catching lug disengages from the catching surface and the slider member is pushed out of the housing into the removal position by the opening spring element. Alternatively, the bending bar, together with the catching lug, can be provided on the housing and the catching surface can be provided on the slider member. The catching lug preferably juts out from the side of the slider member or acts on the side of the slider member, as the case may be, but it may alternatively be provided on an upper or lower face of the slider member. The invention has the advantage that the bending bar and the unlatching button of its latching arrangement are of a simple shape and, as a result, can be manufactured economically.

In a preferred embodiment, the unlatching button juts out laterally from the free end of the bending bar. It is preferably integral with the bending bar. Pressure on the unlatching button from the front, that is to say parallel to the longitudinal direction of the bending bar, causes the bending bar to bend resiliently because the force is applied laterally of the bending bar and is converted, via the unlatching button, int a bending moment acting on the bending bar. It is thus possible to manufacture a latching arrangement that is mechanically and structurally very simple, which reliably latches the slider member in its position pushed into the housing.

For providing additional support for the unlatching button, the latter may have a spring element, for example a resilient tongue jutting out from the unlatching button in extension thereof, by means of which the unlatching button is supported against the slider member or, where the latching arranged is provided on the housing, against the housing.

The bending bar of the latching arrangement and the unlatching button, which is preferably integral with the bending bar, may be formed integrally with the slider member or with the housing. Preferably, the bending bar and unlatching button are a separate piece from the slider member of the housing. They can, for example, be inserted in a form-fitting manner into a recessed region in the slider member, the bending moments occurring in the bending bar being passed into the slider member as a result of the form-fit. The separately formed embodiment has the advantage that the slider member can be manufactured from reasonably priced plastics and the bending bar, which must consist of high-grade, permanently resilient material, requires only little material. Thus, the materials costs of the storage device according to the invention can be reduced. A further advantage of the separately formed embodiments is that the unlatching button can be of a different color from the housing.

In another embodiment of the invention, the slider member has an opening or cut-away region on its front face, through which at least a peripheral portion of a compact disc accommodated by the slider member is visible. That opening or cut-away region allows a simple visual check as to whether the slider member is occupied by a compact disc or is empty.

In further embodiment of the invention, the accommodating device has a several slider members, the opening spring elements of which are constructed in the form of bending springs bent towards the front face of the housing. Those bending springs are teeth on a spring comb, the back of which is attached to the housing in the region of a rear face. Thus, the opening spring elements can be manufactured easily, rapidly and together in one operation and are easy to handle so that they also can be mounted together in the housing.

In order to hold a compact disc against a slider member without rattling and to avoid the compact disc and slider member moving relative to each other, which would damage the compact disc, a practical form of the invention provides one or more holding spring elements, for example in the form of resilient tongues integral with the slider member, which push against the periphery of a compact disc accommodated by the slider member and, as a result, urge the compact disc under an undercut region arranged on the slider member on a side of the periphery of the compact disc approximately opposite the holding spring elements.

In a preferred embodiment, for the occupied/empty indicator, especially when it is dark, a light guide is provided, which, at least when the slider member has been pushed into the housing, leads from a light source to a peripheral edge of a compact disc accommodated by a slider member. The light source may be an incandescent bulb, especially an incandescent bulb already present in the motor car for the purpose of illuminating instruments or switches at night. The compact disc, which is usually manufactured from light-conducting materials, is in the case used as a light guide. The peripheral edge appears illuminated, at least in the region of the front face of the slider member, so that when it is dark it is easy to see whether or not a compact disc is accommodated by the slider member. In embodiments of the invention, the light source may also shine directly on the peripheral edge of the compact disc.

In accordance with a further embodiment of the invention has a branching light guide, which starts at a common light source and runs to several slider members.

In still further embodiment of the invention, it has a resilient catching lug, which hits a travel limit stop when the opening spring element pushes the slider member out of the housing into the removal position, thereby limiting the travel of the slider member and fixing its removal position.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
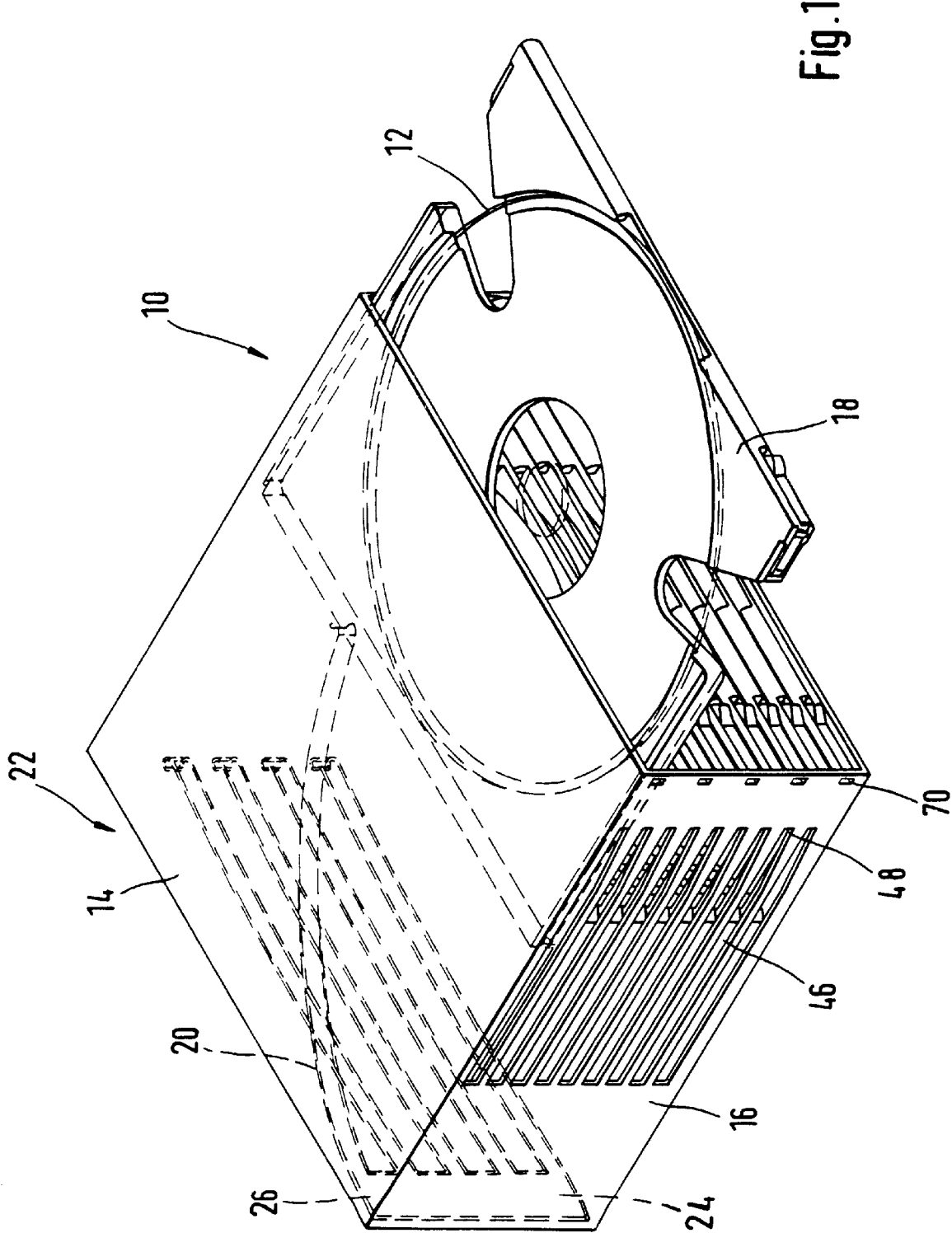
FIG. 1 shows, in a perspective representation, a storage device according to the invention.

A storage device 10 for compact discs 12 according to the invention shown in FIG. 1 is intended especially for mounting in a central console of a motor car. The storage device 10 has a box-shaped housing 14, which is open at its front face. The side walls 16 thereof are provided with ribs (not visible in the drawing) running in the longitudinal direction and projecting inwards, which form slider member guide means, by means of which slider members 18 used to accommodate the compact discs 12 are guided in the manner of drawers.

The slider members 18 are urged by opening spring elements into a removal position projecting from the front face. The opening spring elements are formed by bending springs 20, which are mounted at one of their ends in the lateral region of a housing rearwall 22 and which are curved towards the front face of the housing 14. When the slider member 18 is in its pushed-in position in the housing 14, the bending springs 20 are positioned against, or at a small distance in front of, the housing rear wall 22.

The bending springs 20 are integral constituents of a spring comb 24, the teeth of which they form and the back 26 of which is fixedly mounted in the lateral region of an inside face of the housing rear wall 22. The bending springs 20 lie transversely in the housing 14. The storage device 10 according to the invention has two such spring combs 24, only one of which is shown, for the sake of clarity. The second spring comb (not shown) is arranged in an opposite orientation to the spring comb 242 shown, having its back at the other end of the housing rear wall f22. Its teeth, which are constructed as bending springs, lie between the bending springs 20 of the spring comb 24 shown. The bend springs 20 of a spring comb 24 therefore act on every second slider member 18, the intermediate slider members 18 being urged by the bending springs of the other spring comb into the removal position projecting out of the housing 14.

Figure 2:
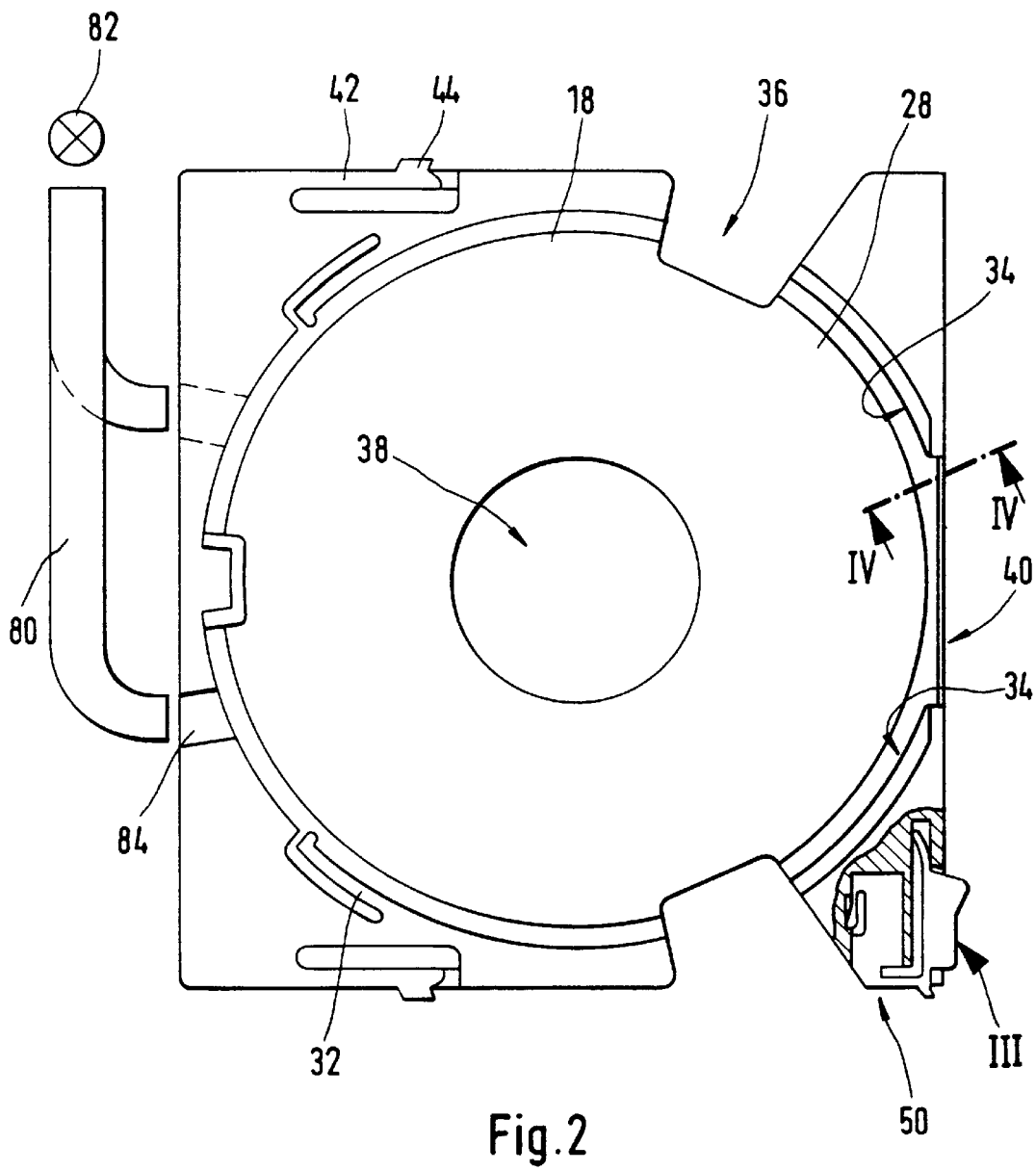
FIG. 2 shows, in a plan view, a slider member of the storage device shown in FIG. 1.
Figure 4:
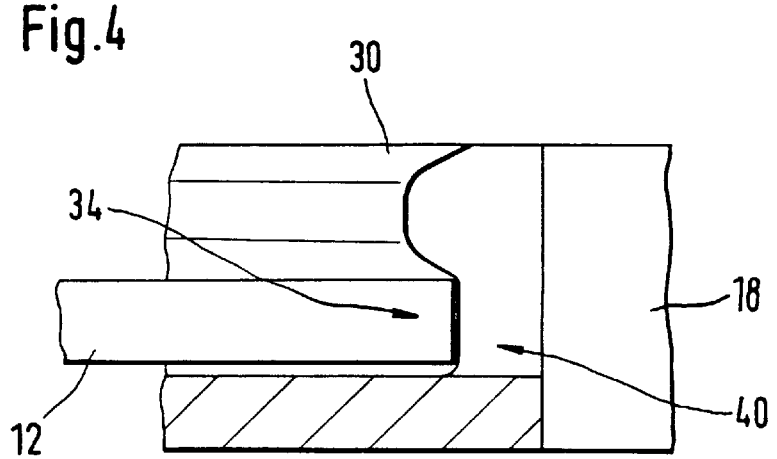
FIG. 4 shows a sectional view according to line IV—IV in FIG. 2.

In FIG. 2, the slider member 18 is shown in plan view, with its front face being on the right in FIG. 2. The slider member 18 has a circular depression 28 of the same diameter as the compact disc 12 as a receptacle for the compact disc 12. In order to be able to insert the compact disc 12 more easily, the depression 28 has a chamfer 30, that is in the depression 28 widens in the manner of a funnel or cone at its upper edge (of. FIG. 4).

For the purpose of holding a compact disc 12 which has been inserted into the receptacle 28 of the slider member 18, the slider member 18 has two holding spring elements 32, which co-operate with undercut regions 34. The holding spring elements 32 are constructed in the form of resilient tongues 32, which are integral with the slider member 18 and arranged laterally in the rear region of the receptacle 28. The resilient tongues 32 are located on the periphery of the receptacle 28 and run in a peripheral direction. They urge the inserted compact disc 12 in the direction towards the front face of the slider member 18, that is to say to the right in FIG. 2. In the region of the front face, the recessed receptacle 28 has, on its periphery, undercut regions 34 (of. FIG. 4), into which a compact disc 12 inserted into the receptacle 28 of the slider member 18 is urged. The compact disc 12 is inserted by pushing the compact disc 12 backwards against the resilient tongues 32 and pressing the compact disc 12 down in the region of the front face of the slider member 18 into the undercut region 34. The compact disc 12 is likewise taken out by pushing the compact disc 12 towards the rear against the resilient tongues 32 and lifting it out of the recessed receptacle 28. In order that the compact disc 12 can be grasped easily, the slider member 18 has two lateral cut-away regions 36, which extend into the receptacle 28, and a central hole 38, which allows an index finger to be pushed through a central hole in a compact disc 12 lying in the receptacle 28 so that, by gripping the periphery with a thumb, the compact disc 12 can be held between index finger and thumb.

For the occupied/empty indicator, the peripheral wall of the recessed receptacle 28 has, on the front face of the slider member 18, a cutaway region 40, which interrupts the undercut region 34 and through which it is possible to see, when the slider member 18 has been pushed into the housing 14, whether or not there is a compact disc 12 in the receptacle 28 of the slider member 18.

For the purpose of limiting travel of the slider member 18 out of the housing 14, the slider member 18 has two integral resilient tongues 42 running in the longitudinal direction of the slider member 18 and arranged on its two sides in its rear region. The resilient tongues 42 have laterally projecting catching lugs 44, which engage in longitudinal slots 46 in the side walls 16 of the housing 14. A closed front end 48 of those slots 46 forms a travel limit stop, which the catching lugs 44 of the slider member 18 hit when the slider member 18 is urged by the bending spring 20 into the removal position projecting out of the housing 14. When the slider member 18 is first inserted into the housing 14 for the purpose of assembling the storage device 10 according to the invention, the resilient catching lugs 44 are pressed inwards by the slide wall 16 of the housing 14 and on reaching the slots 46 rebound into them.

Figure 3:
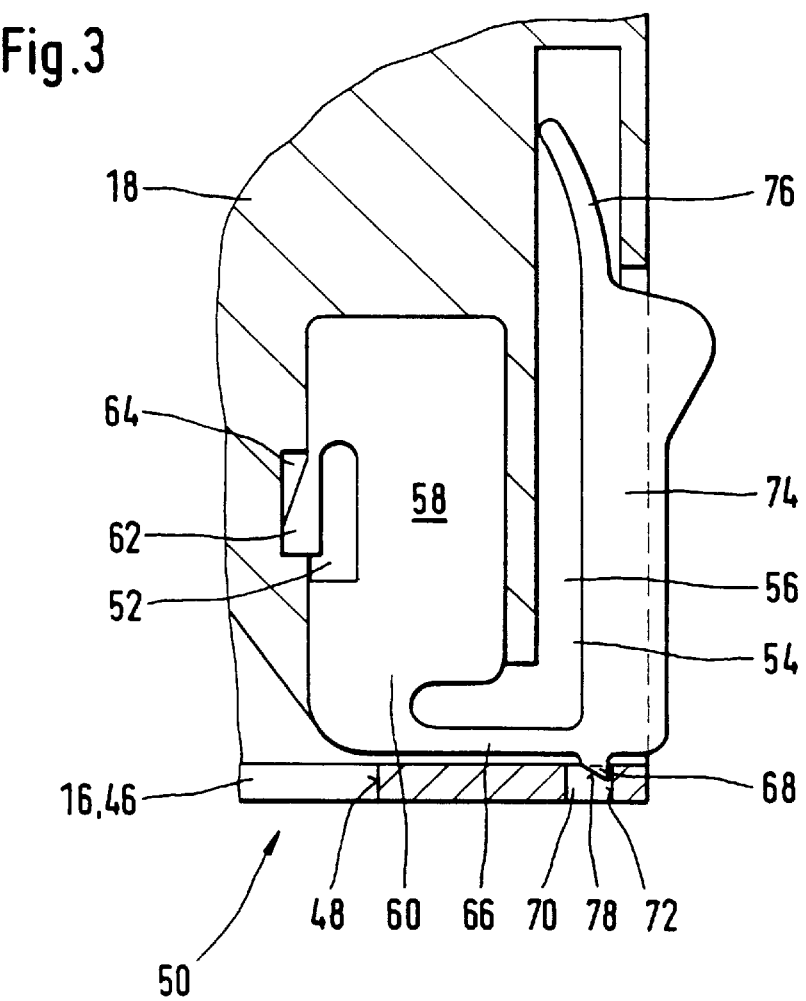
FIG. 3 shows in a plan view, an enlargement of a detail in accordance with arrow III in FIG. 2.

In order to retain the slider member 18 in the position pushed into the housing 14, the storage device 10 according to the invention has a latching arrangement 50 (FIG. 3). The latching arrangement 50 is arranged laterally on the front face of the slider member 18, more specifically alternating from the right-hand side of one slider member 18 to the left-hand side of another slider member 18. The latching arrangement 50 is preferably provided on the same side as that against which the bending spring 20 presses. The slider member 18 has a rectangular recess 52 open to the side, in front of which there is a slot 54, which is likewise open to the side and is also open in front of which there is a slot 54, which is likewise open to the side and is also open at the front face and which communicates with the rectangular recess 52 and runs along the front face of the slider member 18. The recess 52 and the slot 54 are covered by wall plates 56 towards the top and bottom, which are integral with the slider member 18, that is to say they are closed to the upper and lower faces of the slider member 18. The recess 52 and the slot 54 can be instead provided in the housing 14.

Inserted in the rectangular recess 52 is a complementary main body 58 of a latching part 60, which is locked in the recess 52 of the slider member 18 by means of a catching lug 62, which engages in a niche 64 of the rectangular recess 52 of the slider member 18. A bending bar 66 juts out from the main body 58 along the side of the slider member 18 towards the front face thereof. The bending bar 66 is consequently located on the inside along the side wall 16 of the housing 14. Integral with the bending bar 66 at its end remote from the main body 58, there is a laterally projecting catching lug 68, which engages in an opening 70 in the side wall 16 of the housing 14. The opening 70 is located in front of the front end 48 of the slot 46 in the side wall 16, which front end 48 forms the travel limit stop. A front edge of the opening 70 forms a catching surface 72, on which the catching lug 68 acts and holds the slider member 18 in the position pushed into the housing 14 against the force of the bending spring 20.

For unlatching, the latching arrangement 50 has an unlatching button 74, which is formed integrally with the free end of the bending bar 66 away from the main body 58 and juts out at a right angle from the bending bar 66 towards the longitudinal centre of the slider member 18. The unlatching button 74 is located in the slots 54 of the slider member 18. It projects through the slot 54, which is open at the front face, slightly beyond the front face of the slider member 18 and is supported against the slider member 18 by means of a resilient tongue 76, which forms an extensive of the unlatching but 74 on an end away from the bending bar 66. In order to unlatching the slider member 18, the unlatching button 74 is actuated, that is to say pressed into the slider member 18 from the front face thereof. As a result, the bending bar 66 is bent resiliently towards the longitudinal centre of the slider member 18 and its catching lug 68 comes free of the catching surface 72, whereupon the bending spring 20 urges the slider member 18 into the removal position projecting out of the housing 14. When the slider member 18 is pushed completely into the housing 14 against the force of the bending spring 20, an oblique surface 78 of the catching lug 68, as a result of contacting the side wall 16 of the housing 14, pushes the bending bar resiliently inwards until the catching lug 68 rebounds into the opening 70 in the side wall 16 of the housing 14.

A light guide 80 is arranged on the inside face of the housing rear wall 22, as shown in schematic manner in FIG. 2. That light guide 80 starts at a common light source 82 and branches out at rear faces of the slider member 18 guided in the housing 14. When the light source 82 is switched on, the light guide 80 shines light through openings 84 in the rear face of the slider member 18 in the plane of the slider member 18 on a periphery of a compact disc 12 lying in the slider member 18. The compact disc 12, which usually has been manufactured from light-conducting material is used as a light guide and its periphery appears illuminated at least in the region of the front face of the slider member 18 as a result of the illumination by the light guide 80. As a result, it is possible to see, even when it is dark, whether or not there is a compact disc 12 in a slider member 18 pushed into the housing 14.

It will be understood that each of the elements described above, or two or more together, may also find a useful application in other types of constructions differing from the types described above.

While the invention has been illustrated and described as embodied in storage device for preferably several compact discs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A storage device for compact disks, comprising a housing; a slider member adapted to accommodate a compact disk; guide means provided in said housing for guiding said slider; spring means urging said slider member into a removal position projecting out of said housing; a latching arrangement holding said slider member against a force of said spring means in a position pushed into said housing; an unlatching button for unlatching said latching arrangement; said latching arrangement having a bending bar with one end fixedly attached and another end which is free, said bending bar having at a distance from said fixedly attached end, a catching lug; a catching surface in which said catching lug is in engagement when said slider member is in said pushed-in position, said bending bar having said unlatching button at said free end so that on actuation of said unlatching button said bending bar is bent resiliently so that said catching lug comes free of said catching surface, said unlatching button having an end facing away from said bending bottom and being provided with a spring element supporting said unlatching button against an element selected from the group consisting of said slider member and said housing; and a recessed region serving as a seat for said bending bar and formed in said slider member, said bending bar bearing said unlatching button being mounted in said recessed region.

2. A storage device as defined in claim 1, wherein said bending bar is fixedly attached to said sliding member.

3. A storage device as defined in claim 1, wherein said one end of said bending bar is fixedly attached to said housing.

4. A storage device as defined in claim 1, wherein said catching surface is provided on said housing.

5. A storage device as defined in claim 1, wherein said unlatching button is arranged to jut out laterally from said free end of said bending bar.

6. A storage device as defined in claim 1, wherein said slider member has a front face provided with a cut-away region through which a compact disk accommodated by said slider member is visible.

7. A storage device as defined in claim 1; and further comprising at least one further said slider member; and a spring comb with a back attached in a region of a rear face of said housing, said spring comb having teeth formed so that they form bending springs which are bent toward a front face of said housing, each bending spring forming a spring element of said spring means for a respective one of said slider member.

8. A storage device as defined in claim 1, wherein said slider member has a holding spring element adapted to push against a periphery of a compact disk accommodated by said slider member and urging the compact disk under an undercut region of said slider member, said undercut region being arranged on said slider member to be approximately opposite to said holding spring element.

9. A storage device as defined in claim 1; and further comprising a light source which is arranged so as to illuminate a peripheral edge of a compact disk accommodated by said slider member.

10. A storage device as defined in claim 9; and further comprising a light guide which leads from said light source to a peripheral edge of a compact disk accommodated by said slider member.

11. A storage device as defined in claim 10; and further comprising at least one further slider member, said light guide starting at said light source and branching toward said slider member.

12. A storage device as defined in claim 1; and further comprising a resilient catching lug and a travel limit stop with which said resilient catching lug is in contact when said slider member is in the removal position.

13. A storage device as defined in claim 12, wherein said slider member is provided with said resilient catching lug, said housing being provided with said travel limit stop.

* * * * *